United States Patent [19]

Chang

[11] 4,023,907
[45] May 17, 1977

[54] REFLECTIVE DRILL GUIDE

[76] Inventor: Sin Kung Chang, 1896 Bough Beeches Blvd., Mississauga, Ontario, Canada

[22] Filed: Oct. 7, 1975

[21] Appl. No.: 620,264

[52] U.S. Cl. .............................. 356/138; 408/72 B; 408/115 R
[51] Int. Cl.² ........................................ G01C 1/00
[58] Field of Search ............ 356/138, 193; 33/197, 33/174 G; 396/138

[56] References Cited

UNITED STATES PATENTS

| | | | |
|---|---|---|---|
| 2,862,302 | 12/1958 | Lucia | 33/197 |
| 3,436,155 | 4/1969 | Perin | 356/138 |

FOREIGN PATENTS OR APPLICATIONS

| | | | |
|---|---|---|---|
| 127,956 | 4/1950 | Sweden | 33/197 |

*Primary Examiner*—John K. Corbin
*Assistant Examiner*—R. A. Rosenberger

[57] ABSTRACT

A disposable drill bit guide for optically guiding a drill bit in a manner normal to a workpiece, and having, a sheet of relatively thin disposable material said sheet having a reflective surface for providing a reflective image of a drill bit, adhesive means on said sheet for adhesively fastening same on a workpiece with said reflective surface exposed to view, and visible guide lines on said sheet, said guide lines intersecting one another at right angles, whereby a drill bit may be centered on such intersection and its image viewed in said reflective surface, and checked with reference to said guide lines.

8 Claims, 4 Drawing Figures

U.S. Patent    May 17, 1977    4,023,907
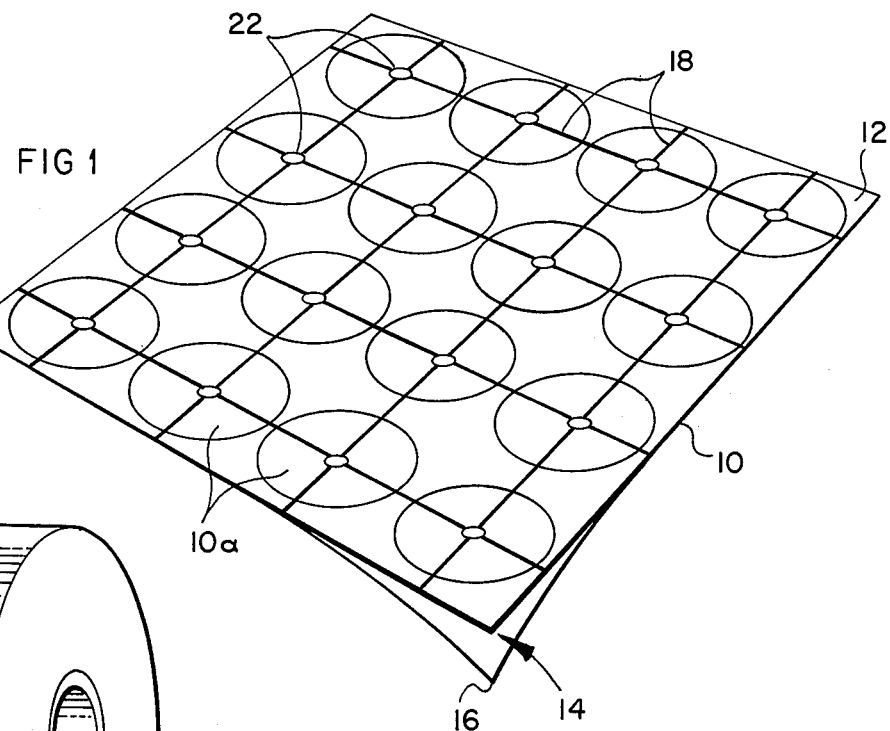
FIG 1
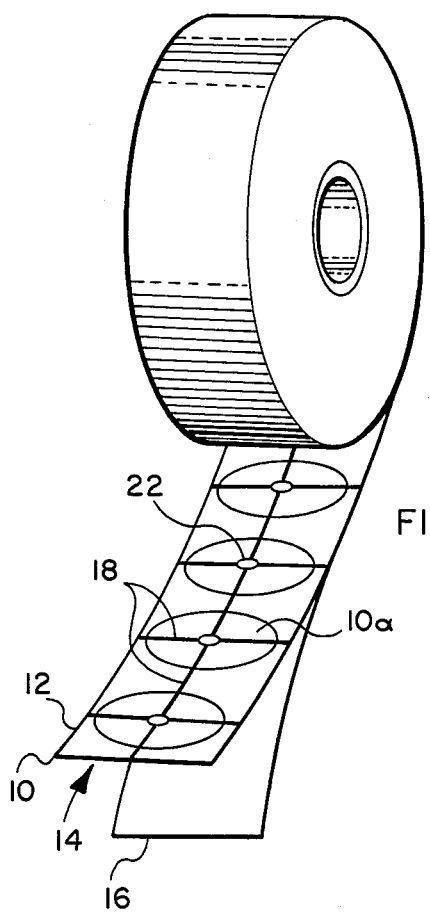
FIG 2
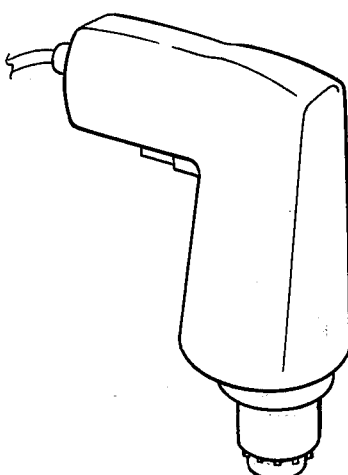
FIG 3
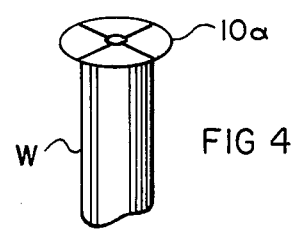
FIG 4
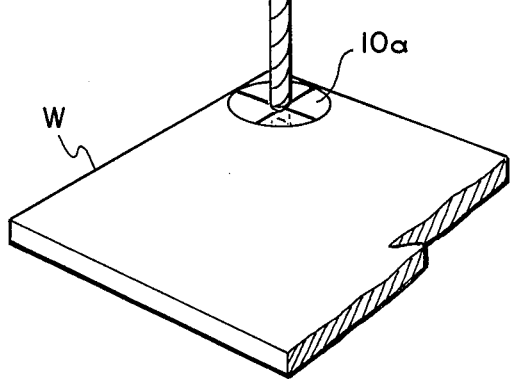

REFLECTIVE DRILL GUIDE

The present invention relates to a device for guiding a drill bit so as to ensure that it is applied at 90° to a workpiece.

BACKGROUND OF THE INVENTION

Hand held drills, both manual and power drills, require that the operator must hold the drill with the drill bit at precisely 90° to the workpiece.

If the drill bit is not held true then the hole will deviate from its true course. This can happen even when a pilot hole is drilled out to a larger size.

Many different devices have been proposed for the purpose including sleeve-like devices designed to receive the drill bit and ensure that it is held normal to the workpiece. Obviously, such a sleeve must fit the shank of the drill bit accurately so that a number of different sleeves must be provided for different sizes of drill bits. In addition, such sleeve devices may make it difficult to center the drill on the punch or other marking on the workpiece.

It has been proposed in U.S. Pat. No. 3,436,155 to employ a metal panel having a reflective surface and having a series of different size holes through the panel to receive different sizes of drill bits. The shank of the drill bit is reflected on the surface of the panel and in this way it is possible visually to control the angle of the drill bit relative to the workpiece.

This proposal however was still subject to many of the disadvantages inherent in the sleeve type of drill guide. For example, it was necessary to provide a fairly large panel. The panel would have to be provided with a number of different holes one for each of the drill sizes for which the panel was designed. Obviously, in order to be effective, each of the holes would have to be spaced a considerable distance from the other holes so as to provide a sufficient reflective area around that particular hole so as to provide effective optical guidance for the drill bit. One of the disadvantages of the relatively large size of panel is that when working on many surfaces, holes will be required to be drilled close to an edge and it may be impossible to use the relatively large reflective metal panel in a confined area such as a corner or edge of a workpiece. Furthermore, if the panel is relatively thin it will soon become worn around the edges of the various holes and then become inaccurate and such a thin panel cannot be clamped in position on a workpiece. On the other hand, if the panel is made sufficiently thick to withstand substantial wear it will become excessively costly and cumbersome and such a thick panel has the effect of partially hiding the centre punch mark on the workpiece. Thus if the panel slips, the operator will not readily notice it and the hole will be off centre.

It will also be noted that as the panel was being handled, it would normally be carried in a tool kit where it would receive fairly rough treatment. It could be therefore anticipated that the reflective surface of the panel would very quickly become scarred and scratched and loose its effectiveness.

For all of these various reasons therefore the metal panel with a reflective surface was unsatisfactory for the purpose for which it was intended.

BRIEF SUMMARY OF THE INVENTION

It is the general objective of the invention to provide a drill guide providing a good mirror image reflection of the drill, and having visible intersecting guide lines by which the drill bit may be optically aligned normal to the workpiece, and in which the drill guide is disposable, and does not have to be provided with a number of different sized holes for different size drill shanks, the material of the drill guide being soft and easily penetrated by the drill, and being used only once for the drilling of any one hole. The drill guide according to the invention would therefore be capable of accepting drill bits of virtually any size which may be used in a hand held drill and would be used once and then discarded. In accordance with the invention the drill guide material will be thin and relatively flexible for example metallic foil, or thermoplastic material coated with a metallized or other reflective surface, or any other relatively cheap reflective material, and will have an adhesive layer on its underside so that it may be glued in place on the workpiece. Preferably, the drill guide according to the invention will have on its reflective surface, two intersecting guide lines which may be printed, scribed or marked in any other way, at right angles to one another and a small pilot hole at the intersection of the two guide lines. In this way it is possible for the drill guide according to the invention to be optically located over a punch mark or pilot hole in a workpiece for example.

The invention contemplates that the drill guide portions may be manufactured in sheet form, or alternatively in roll form. In either case, some means would normally be provided to facilitate removal off a suitable portion of drill guide material from the sheet or roll. The drill guide portions may be simply punched or die cut circles of the guide material providing a line of weakness.

Alternatively a protective backing panel of for example paper may carry a number of pre cut circular drill guide portions, each one having intersecting guide lines, and a pilot hole, the drill guide portions, having an adhesive backing layer, and being strippable one at a time from the backing. In order to maintain a highly reflective surface, it may in some cases be desirable to apply a strippable layer or coating over the reflective surface which may be either stripped off prior to use, or which may be transparent so that the reflective surface does not become damaged during handling.

Alternatively the drill guides can be punched or die cut complete with their protective backing panel portion and used loose.

In some cases where for example holes must be drilled by hand in large castings or sub assemblies, large sheets of the drill guide material may be prepared to be actually stuck on a side of the casting, and having hole locations already printed on the sheet with intersecting guide lines at each location.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a perspective illustration of a sheet of reflective drill guide material according to the invention;

FIG. 2 is a perspective illustration of a roll of reflective drill guide material according to the invention;

FIG. 3 is a perspective view showing the drill guide according to the invention in use on a workpiece, and, FIG. 4 shows the drill guide in use in a different situation.

DESCRIPTION OF A SPECIFIC EMBODIMENT

Referring now to FIG. 1, it will be seen that the form of the invention there shown comprises a sheet 10 of reflective material provided which may have a transparent protective coating layer 12 on its upper surface although this is not essential and an adhesive bonding layer 14 on its under surface. The adhesive bonding layer 14 in this case is of the self-adhesive type, and is protected by a strippable backing layer 16. The backing layer 16 may be paper or any other suitable material as is well known for the purpose.

Alternatively, the adhesive layer may of course require to be moistened or activated in some way just prior to use, in which case it will not normally require a strippable backing such as the layer 16.

The reflective sheet 10 in this case is a sheet of plastic Mylar (trade mark) material preferably having a thickness of about 0.010 to 0.012 of an inch and having a metallized reflective coating. However, the thickness of the material is not critical to the invention provided it is capable of being glued flat on a workpiece to provide a good flat reflective image of the drill bit.

The sheet 10 may equally be made of other material for example a sheet of aluminum foil or any other material provided with a metallized or other reflective coating, or some other form of reflective material may be suitable for the purpose.

On the surface of the reflective material 10, or for example incorporated in the transparent coating layer 12, there is preferably provided, a series of intersecting crisscross guide lines 18.

Preferably, at the intersection of each of the grid lines 18, there will be provided a small pilot hole 22 extending completely through the reflective sheet 10 and the strippable backing 16.

To provide circular drill guide portions 10a the material 10 may be punched or die cut in such a manner that it is either weakened, or completely cut through, without cutting the backing layer 16.

Alternatively the die cutting may completely sever circular portions 10a, together with backing layer 16 adhering thereto.

The circular shape is merely a convenience and any other shape could be used. The material could equally well be cut out with scissors each time a drill guide portion is required, and the die cutting ommitted altogether.

In use, a portion 10a of the material 10 is peeled off the backing layer (or is cut out and peeled off as described above). The drill guide portion 10a is then placed in position over any suitable marking on a workpiece (see FIG. 3). Such marking will usually take the form of a small indentation punched by a center punch in accordance with well known techniques, or may be any other suitable marks scribed on a workpiece. In any event, such a marking will be visible through the pilot hole 22.

If the marking however is some different type, for example a pair of intersecting criss-cross lines formed on the surface of the workpiece, then it may be possible to line up the reflective layer 10 by simply aligning the grid lines 18 with the criss-cross lines scribed on the workpiece. However, this system may be somewhat more inaccurate than the use of a center punched mark visible through the pilot hole 22.

The drill bit is then applied with its tip in the center punched mark, and centered on the pilot hole 22. The drill is then operated and it will first of all remove a portion of the layer 10 around the pilot hole 22 to permit the drill bit to pass therethrough. While drilling is taking place the operator by simply sighting down the shank of the drill bit itself will be able to detect any deviation from a true 90° angle by simply watching the reflection of the drill bit on the reflective surface 10. The guide lines 18 will assist in optically checking and correcting the angle of the drill bit, while drilling.

When he has completed drilling that hole he will simply strip away the portion 10a and throw it away and drill the next hole using a fresh piece of the material.

In accordance with another form of the invention as shown in FIG. 2, the reflective sheet 10 is shown in the form of a continuous roll or strip provided with a strippable backing layer 16 and an adhesive layer 14 and a protective coating 12 and preferably die cut in the same way as before.

Alternatively, if a workman is provided with scissors or shears it will be possible for him to cut out a suitable portion of the material either when it is in roll form or in sheet form.

The same grid lines 18 may be provided, and pilot hole 22 to assist in centering the reflective layer on the center punched or marked position for the hole.

As mentioned above the invention also envisages that a panel of the guide material may be made as large as the workpiece itself, for example, a casting, requiring many holes to be drilled. The panel would be printed with intersecting grid lines at the centre of each hole to be drilled. Information concerning the size of drill to be used may also be printed on the panel. The panel is then adhesively bonded in position on the casting and remain there while all holes are drilled out.

In this case no pilot holes are punched in the panel, to ensure complete accuracy.

Such a panel might appear similar to the panel of FIG. 1, without either pilot holes 22, or die cutting of circular portions 10a. The intersecting guide lines 18 would of course be located on the panel, only where holes are required in the casting.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A disposable drill bit guide for optically guiding a drill bit in a manner normal to a workpiece, and comprising;

a guide portion of relatively thin disposable material said portion having a reflective surface for providing a reflective image of a drill bit and having a predetermined length and width;

adhesive means on one side of said portion for adhesively fastening same on a workpiece with said reflective surface exposed to view, and, visible guide lines on said portion extending from side to side thereof, said guide lines intersecting one another at right angles, at about the centre of said portion, whereby a drill bit may be centred on such intersection and its image viewed in said reflective surface, and checked with reference to said guide lines, operation of the drill bit removing a central area of said guide portion.

2. A disposable drill bit guide as claimed in claim 1 wherein said guide portion of thin disposable material is formed of flexible synthetic plastic sheet material, having a metalized reflective surface applied thereto.

3. A disposable drill bit guide as claimed in claim 2 including protective backing sheet means covering said adhesive means, said backing sheet means being strippable to expose said adhesive means for fastening said portion on said workpiece.

4. A disposable drill bit guide as claimed in claim 3 including a pilot hole punched through said portion at the intersection of said guide lines.

5. A disposable drill bit guide as claimed in claim 4 wherein said sheet of thin disposable material is cut to form a plurality of disk portions, and including a backing sheet means covering said adhesive means, said backing sheet means carrying a plurality of said disc like portions in spaced apart relation.

6. A disposable drill bit guide as claimed in claim 5 including a plurality of said guide lines, arranged in pairs whereby to define intersections on said sheet at different spaced points thereover centered on respective disc portions.

7. A disposable drill bit guide as claimed in claim 5 including transparent coating means over said sheet protecting said reflective surface thereof.

8. A disposable drill bit guide as claimed in claim 5, wherein said sheet is in the form of an elongated band, with said disc portions arranged therealong at spaced intervals, and a said guide line extending longitudinally along the centre of said band, and a plurality of guide lines extending transversely of said band intersecting said longitudinal guide line at the centre of respective disc portions.

* * * * *